United States Patent [19]

Macdonald

[11] Patent Number: 5,725,137
[45] Date of Patent: Mar. 10, 1998

[54] CARRIER RACK AND RACK RETAINER

[76] Inventor: Brian Macdonald, 799 Delmonte Place, Victoria, B.C., Canada, V8Y 2W3

[21] Appl. No.: 798,625

[22] Filed: Feb. 11, 1997

[30] Foreign Application Priority Data

Jun. 17, 1996 [CA] Canada ................... 2179259

[51] Int. Cl.$^6$ .............................................. B60R 9/00
[52] U.S. Cl. ........................... 224/405; 296/3; 211/206
[58] Field of Search ........................ 224/405, 309, 224/326; 296/3, 7, 8; 211/206

[56] References Cited

U.S. PATENT DOCUMENTS

| | | | |
|---|---|---|---|
| 3,765,713 | 10/1973 | Suitt | 296/3 |
| 4,138,046 | 2/1979 | De Freze | 296/3 |
| 4,152,020 | 5/1979 | Brown et al. | 296/3 |
| 4,211,448 | 7/1980 | Weston | 296/3 |
| 4,509,787 | 4/1985 | Knaack et al. | 296/3 |
| 4,779,916 | 10/1988 | Christie | 296/3 |
| 5,143,415 | 9/1992 | Boudah | 296/3 |
| 5,152,570 | 10/1992 | Hood | 296/3 |
| 5,190,337 | 3/1993 | McDaniel | 293/3 |
| 5,439,152 | 8/1995 | Campbell | 224/405 |

FOREIGN PATENT DOCUMENTS

2584031  1/1987  France ........................ 296/3

*Primary Examiner*—Henry J. Recla
*Assistant Examiner*—Gregory M. Vidovich
*Attorney, Agent, or Firm*—Barrigar & Moss

[57] ABSTRACT

A carrier rack and rack retainer for use with a pickup truck includes a rack having an assemblable set of at least two rack segments each having a transverse bridge and two columnar bridge support struts, each strut having offset, i.e. parallel but non-collinear, upper end and lower end portions. The upper end portion of each strut mates with a discrete end of the bridge of a discrete rack segment in at least two discrete rotated positions of the strut about the longitudinal axis of the upper end portion of the strut, thereby providing a rack segment with selectable spacing between the lower end portions of the struts. The rack retainer provides at least two pairs of columnar pillars mountable adjacent side walls of the pickup truck cargo area. The spacing between the lower end portions of the struts of each assembled rack segment may be selected to be approximately equal to the spacing between the pillars of a discrete pair of mounted pillars. Each mounted pillar mates with the lower end portion of a discrete one of the struts of a discrete assembled rack segment with the strut in any of its rotated positions.

22 Claims, 7 Drawing Sheets

CARRIER RACK AND RACK RETAINER

FIELD OF THE INVENTION

The present invention relates to apparatus in or for use with a cargo space at least in part delimited by generally vertical side walls and a floor for supporting a generally horizontally aligned generally rigid load, and more particularly, to a carrier rack and rack retainer for pickup trucks.

BACKGROUND OF THE INVENTION

Carrier racks for pickup trucks are used for supporting elongated tools and materials such as ladders, pipes, and lumber above the cargo space of a pickup truck. In many cases such racks in current use are custom made by a welder and welded or bolted to the pickup truck in such a fashion that removal is difficult and perhaps impossible without damaging the pickup truck. At the very least several people are needed to remove such carrier racks. However, custom made carrier racks are strong, durable, and a cost efficient solution if removability is not necessary.

For many pickup truck owners removability is a desirable feature in carrier racks as pickup trucks are for many the sole family vehicle or a recreation vehicle as well as a working vehicle. It is desirable to be able to quickly and easily remove a carrier rack so that the pickup truck can be used for other purposes. However, removability should not affect the strength or structural integrity of the carrier rack. A desirable carrier rack should be simple, light, easy to remove and reinstall, preferably by one person, yet as strong as a permanently installed carrier rack. A desirable carrier rack should also be adaptable to a range of sizes of pickup trucks and installable by consumers without special tools, such as welding equipment.

The prior art contains examples of removable carrier racks for pickup trucks, but each exhibits an unnecessary degree of complexity and fragility or requires special equipment to initially install.

For example, in U.S. Pat. No. 5,143,415 to Boudah issued 1 Sep. 1992, a truck utility rack made of assemblable pieces is disclosed. Connecting corners incorporating springed push pins are used to lock the various cylindrical tubular cross members and stanchions in place.

Similarly, in U.S. Pat. No. 4,138,046 to De Freze issued 6 Feb. 1979, a demountable rack of cylindrical tubular members is disclosed. Initial installation appears to require cutting each of the cross pieces to the appropriate length for the width of the truck and welding sleeves to opposite ends of the cross pieces. Once so installed the rack can be removed and reinstalled on the same vehicle, but cannot be moved to another vehicle having a different width without fabricating new cross pieces.

This invention seeks to overcome drawbacks of known removable carrier racks for pickup trucks.

SUMMARY OF THE INVENTION

According to the present invention, there is provided for supporting a generally horizontally aligned generally rigid load in or for use with a cargo space at least in part delimited by a floor and generally vertical side walls, the combination of a rack and rack retainer. The rack comprises at least two assemblable rack segments, each rack segment comprised of one bridge and an associated pair of struts. Each strut is a generally vertically extending bridge support column having an upper end portion extending along a longitudinal axis of the upper end portion and a lower end portion and is provided intermediate its end portions with a set of bends providing an offset from one end portion to the other end portion of the strut such that the end portions are generally parallel to each other but not collinear. Each bridge comprises a transverse beam and means for mating each end of the transverse beam with the upper end portion of a discrete one of the associated pair of struts in a selected one of at least two discrete rotated positions of the strut about the longitudinal axis of the upper end portion of the strut. The rack retainer comprises at least two pairs of pillars, each pillar being a generally vertically extending strut support column having an upper end portion and mounting means for mounting the associated pillar generally adjacent to one of the side walls. The pillars, when so mounted, form at least two spaced pairs of pillars having one pillar of each pair mounted adjacent to each side wall. In addition, means are provided for mating the lower end portion of each strut of the pair of struts associated with a discrete one of the bridges with the upper end portion of a discrete pillar of a discrete one of the pairs of pillars when the upper end portion of that strut is mated with a discrete end of the transverse beam of the bridge in a selected one of the rotated positions of that strut about the longitudinal axis of the upper end portion of that strut and when that pair of pillars is mounted adjacent to a side wall. When assembled, each end of the transverse beam of a bridge is mated with the upper end portion of a discrete one of the associated pair of struts forming a complete rack segment having a spacing between the lower end portions of the pair of struts determined by the selected rotated positions of the pair of struts. Each rack segment may then be mated with a discrete one of the pairs of pillars thereby forming a horizontal supporting beam for a portion of the load. Two or more spaced rack segments then form a rack for supporting the load.

BRIEF DESCRIPTION OF THE DRAWINGS

In the drawings, which illustrate embodiments of the invention.

DETAILED DESCRIPTION OF THE INVENTION

Figure 1:
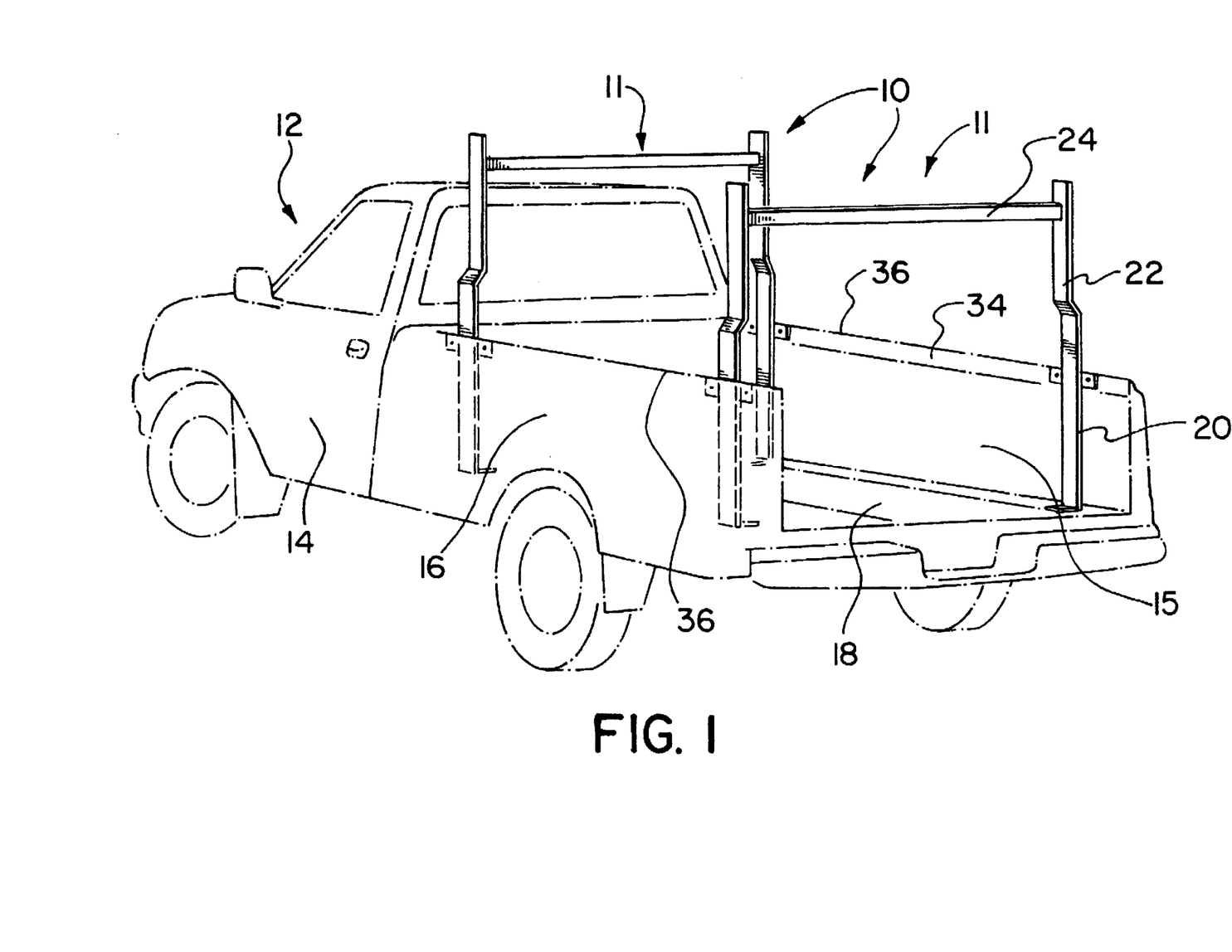
FIG. 1 is a perspective view of a carrier rack and rack retainer for a pickup truck embodying the present invention installed on a pickup truck.
Figure 9:
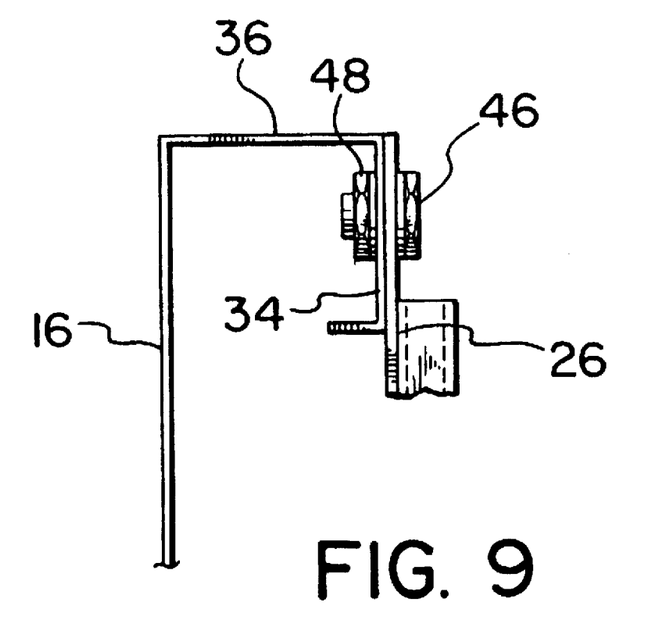
FIG. 9 is a cross-sectional view of the uppermost portion of one of the supporting pillars of the carrier rack and rack retainer of FIG. 1 mounted to a sidewall of the pickup truck.
Figure 10:
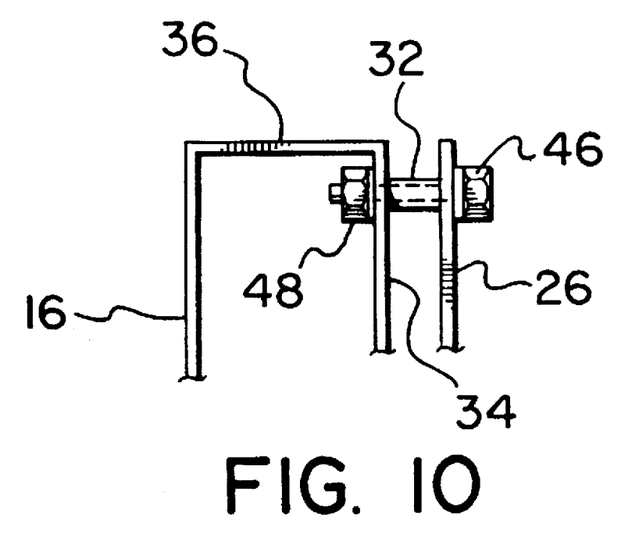
FIG. 10 is a cross-sectional view of the uppermost portion of one of the supporting pillars of the carrier rack and rack retainer of FIG. 1 mounted to a sidewall of the pickup truck using a spacer.

FIG. 1 shows an embodiment of the carrier rack and rack retainer generally indicated by numeral 10 mounted on a typical pickup truck generally indicated by numeral 12. The pickup truck 12 has a cab area 14, side walls 16, side rails 36, and a box 15 defined in part by the side walls 16 and the box floor 18. The side rails 36 extend downward from their inside edge to form side rail walls 34, as also illustrated in FIGS. 9 and 10.

The carrier rack and rack retainer 10 illustrated in FIG. 1 has two identical portions each generally indicated by numeral 11.

Figure 2:
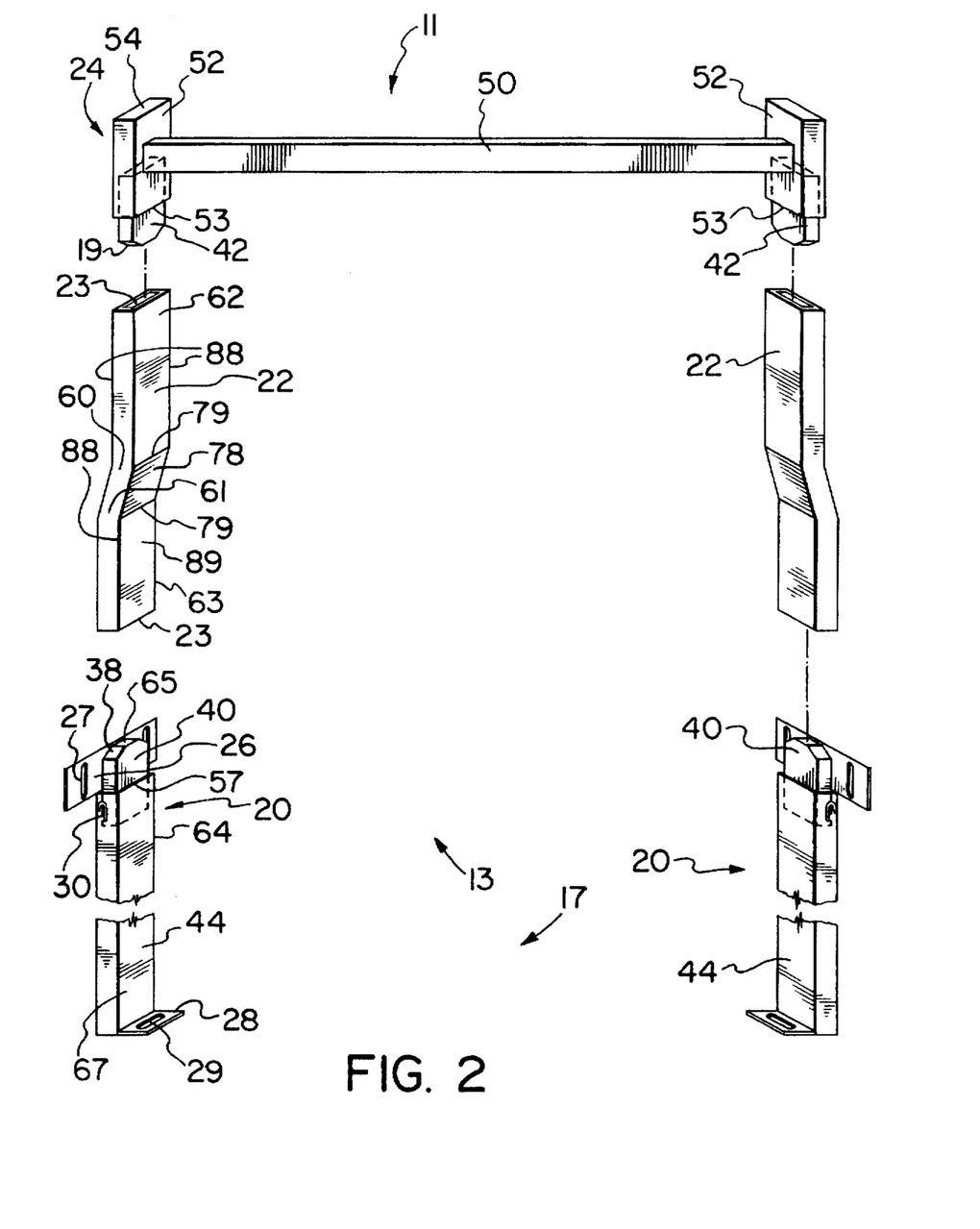
FIG. 2 is an exploded perspective view of one rack segment and associated rack retainer segment of a preferred embodiment of the carrier rack and rack retainer of FIG. 1 showing the several parts in detached position.

FIG. 1 shows the carrier rack and rack retainer 10 in assembled condition installed on pickup truck 12. FIG. 2 shows the major elements of one of the portions 11 of the preferred embodiment of the carrier rack and rack retainer 10 in exploded view. Each portion 11 is comprised of a rack segment generally indicated by numeral 13 and a rack retainer segment generally indicated by numeral 17. Each rack segment is comprised of a bridge 24 and two identical struts 22. Each rack retainer segment 17 is comprised of two identical pillars 20 and associated mounting means described below.

Figures 11, 12:
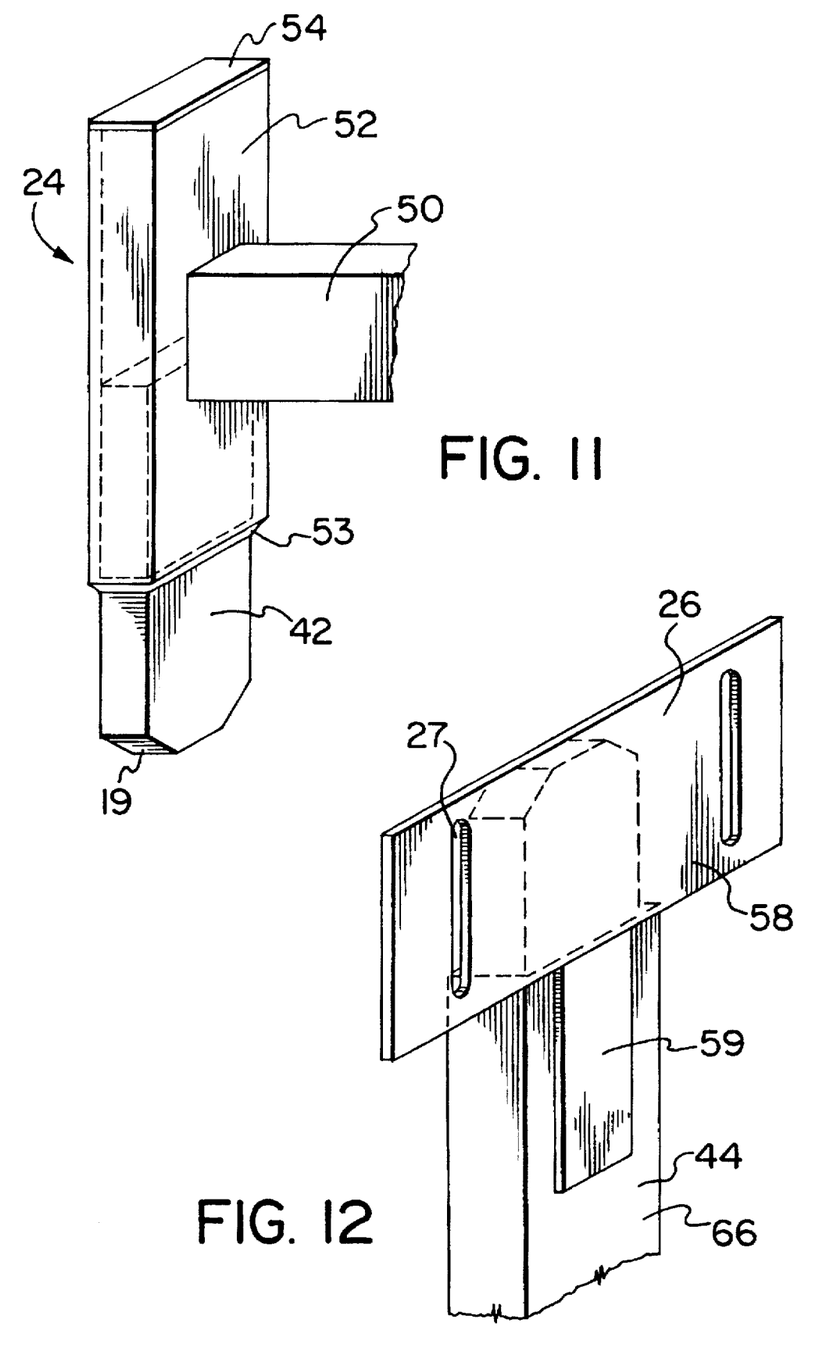
FIG. 11 is a perspective view of the end piece of one bridge of the carrier rack and rack retainer of FIG. 1.
FIG. 12 is a perspective view of the upper portion of one pillar of the carrier rack and rack retainer of FIG. 1.

As illustrated in FIG. 2 and in more detail in FIG. 11, the generally H-shaped bridge 24 is comprised of a transverse element 50 of rectangular 1"×2" channel steel having two identical vertical end pieces 52 also of 1"×2" channel steel welded. A discrete end cap 54 of steel sheet is welded to the uppermost end of each end piece 52. Each end piece 52 is also provided at its lowermost end with an identical downwardly protruding rectangular tongue 42 of ¾"×1¾" steel flat with 45 degree cambers 19. Each tongue 42 is slidingly received by a discrete end piece 52 and attached by fillet weld 53. The width of bridge 24 is selected to be approximately in the middle of the range of widths of typical pickup truck boxes. The preferred width of the bridge 24 is 54".

Each strut 22 is also formed of rectangular 1"×2" channel steel and is comprised of an uppermost portion 62, a middle portion 78, and a lowermost portion 63. Each strut 22 is open at its ends with openings 23 so that any tongue 42 may be matingly and slidingly received by any of the openings 23 (1"×2" channel steel having an inner cross-section matching the cross-section of the tongues 42).

Each of the portions 62/78/63 of strut 22 are generally straight and joined to its neighbouring portion or portions so that the uppermost portion 62 and the lowermost portion 63 are offset, that is, essentially lying along parallel but not collinear lines. The offset may be produced by fabricating the strut 22 out of separate pieces corresponding to portions 62, 78, and 63 using appropriate end cuts and welds or by making two bends in a single piece of channel steel to form a strut 22 having the portions 62, 78, and 63 with the required offset. The cutting angles or bends and length of the middle portion 78 are selected to produce an offset of approximately 1" between the uppermost portion 62 to the lowermost portion 63 of the strut 22. The essential feature is that the strut 22 have an offset. The offset is referred to below and in the claims as produced by bends 60/61 in the strut 22. For example, the bends 60/61 in FIG. 2 are along lines 79 across a wide face 89 of the strut 22, which line 79 is perpendicular to edges 88 of the wide face 89. Because the bends 60/61 are approximately equal but in opposite directions, the uppermost portion 62 and the lowermost portion 63 of the strut 22 are offset. Because each strut has an offset and has rectangular opening 23 for a rectangular tongue 42, each strut 22 can be slid onto a tongue 42 in one of two distinct ways differing from each other by a 180 degree rotation of the strut 22 about the axis of its upper portion. If the offset of each strut 22 is the preferred 1", then approximate spacings of 52", 54", or 56" between the outside faces of the lowermost portions 63 of the struts 22 will result when the struts 22 are slid into the openings 23, in the various possible combinations of directions, for a bridge 24 that is approximately 54" wide. Use of tongues 42 and struts 22 having some cross-sectional shape other than rectangular, for example a regular polygon, may be used to provide more possible spacings by rotation through some angle less than 180 degrees, however, in practice rectangular tongues 42 have been found to provide sufficient adjustability when combined with the use of spacing shims 32 as described below. "Rotation" in this specification and the claims means turning about an axis by some angle that may be less than 360 degrees. In other words, a complete 360 degree rotation is not the intended meaning of "rotation".

Figure 13:
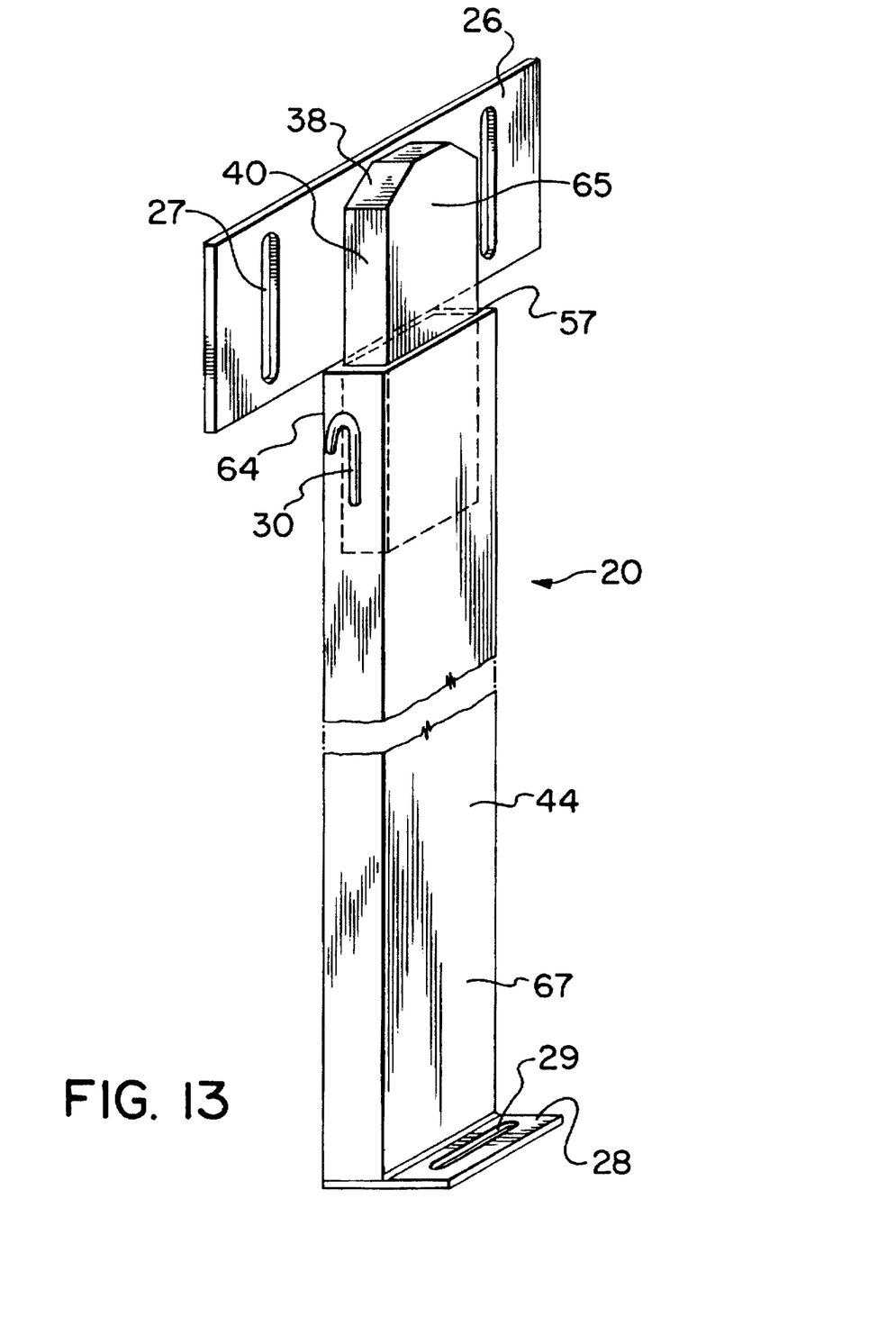
FIG. 13 is a Perspective view of one pillar of the carrier rack and rack retainer of FIG. 1.

As illustrated in FIG. 2 and in more detail in FIGS. 12 and 13, each of pillars 20 has a body 44 of 1"×2" tubular steel with ⅛" walls with a length of approximately 27" having a rectangular tongue 40 of ¾"×1¾" steel flat with 45 degree cambers 38 at the corners of the uppermost end 65 of the tongue 40 protruding approximately 3" upwardly from the uppermost end 64 of the body 44. Each pillar 20 is constructed by sliding an approximately 6" piece of ¾"×1¾" steel flat into the body 44 and welding it in place by fillet welds 57. As illustrated in FIG. 13, a T-shaped side plate 26 of ⅛" steel flat having a cross portion 58 measuring 3"×6" and a 1"×3" vertical portion 59 is attached by welding to one side 66 of the body 44 of the pillar 20 at the uppermost end 64 of the body 44 as illustrated in FIGS. 2 and 12. Two ⅛"×2½" slots 27 are provided in the side plate 26. A ⅛"×2"×2" base plate 28 is welded to the bottom of the pillar 20 overhanging by 1" on the side 67 opposite the side 66 to which the side plate 26 is attached. A ⅛"×1¾" slot 29 is provided in the base plate 28. A tie-down hook 30 is provided on each pillar 20 for assisting in securing a load to the carrier rack and rack retainer 10 and assisting in holding each carrier rack segment 13 to its associated rack retainer segment 17.

Bolts 46, nuts 48, and optional shims 32 illustrated in FIGS. 9 and 10 are provided for installation of the pillars 20. The two pillars 20 of each rack retainer segment 17 are bolted to the opposite side rail walls 34 and the floor 18 as illustrated in FIG. 1. The side plates 26 are attached to the side rail walls 34 in the manner illustrated in FIGS. 9 and 10.

In each case a bolt 46 and a nut 48 is used to bolt the side plate 26 to a side rail wall 34. A shim 32 may be used between the side rail wall 34 and the side plate 26 if necessary to space the pillar 22 farther from the side rail walls. Each pillar 22 is bolted to the floor 18 by nuts 46 and bolts 48 passing through the slot 29 in base plate 28 and holes drilled in the floor 18. Such installation is not shown in the Figures and is conventional.

As can be seen from the above description, the installation of each rack retainer segment 17 must be carried out so that the pillars 20 are spaced by a distance that allows the struts 22 of a rack segment 13 to slidingly fit onto the tongues 40 of the pillars 20. To allow for installation in a variety of pickup truck beds without the use of welding equipment it is necessary for the rack retainer segments 17 to be installable in such a way as to allow the same size bridge 24 to be used without modification. To do this two adjustment features are provided.

First, the offsets in the struts 22 described above allow the lowermost ends 63 of the struts 22 to be received by pillars 20 mounted against side rail walls 34 having outside faces approximately 52", 54", or 56" apart depending upon which combination of offset directions is used in sliding the struts 22 into the end pieces 52. If the required spacing is close to one of these three measurements, then the pillars 20 may be mounted in the fashion illustrated in FIG. 9, with the mounting plate 26 bolted directly against the side rail wall 34 using bolt 46 and nut 48. Exact matching of the spacings of the pillars 20 to the spacings of the struts is not necessary as the struts 22 bend slightly during installation. Slight bending also is believed to be advantageous in assisting in holding the carrier rack and rack retainer 10 together even without a tied down load.

Second, if the side rail walls 34 have a spacing between 52" and 54", between 54" and 56", or greater than 56", the mounting method of FIG. 10 is used for one or both side rail walls 34. A shim 32 is used to space the mounting plate 26 away from the side rail wall 34 by the required distance to produce a spacing of 52", 54", or 56" between the outside faces of the pillars 20. Shims 32 up to a thickness of 1" allow all spacings from 52" to 58" to be accommodated without modification to the bridge 24.

Figure 3:
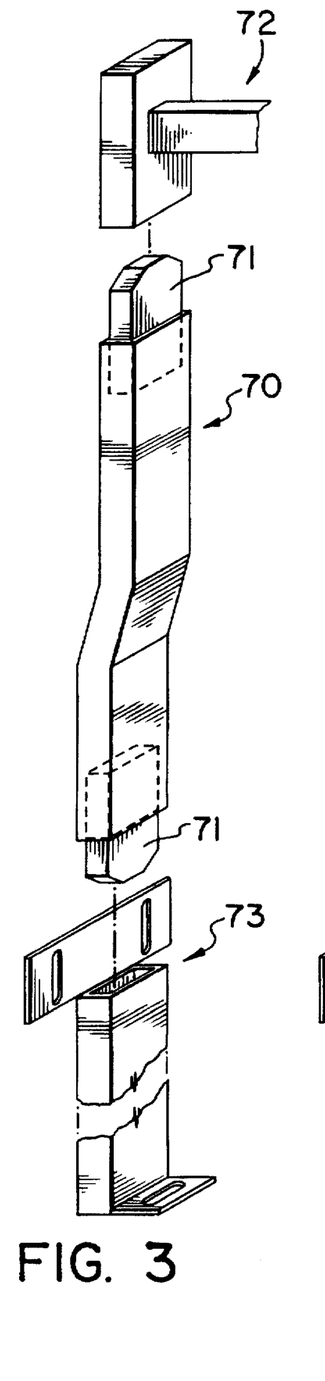
FIG. 3 is an exploded perspective view of one rack segment and associated rack retainer segment another embodiment of the carrier rack and rack retainer of FIG. 1 showing the several parts in detached position.
Figure 4:
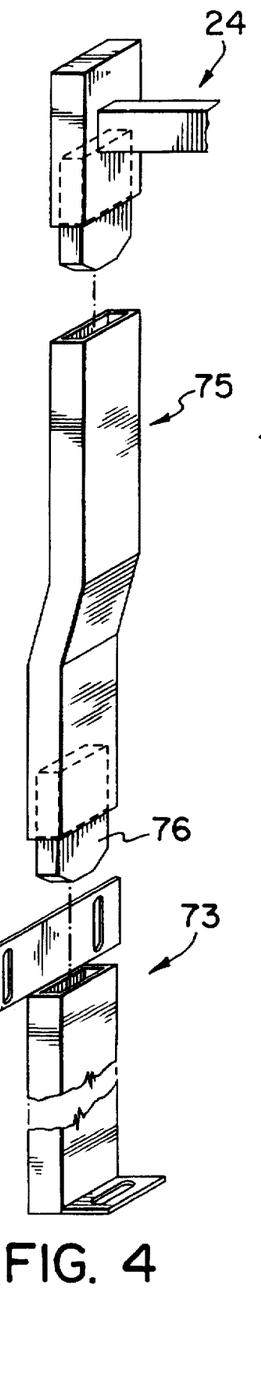
FIG. 4 is an exploded perspective view of one rack segment and associated rack retainer segment another embodiment of the carrier rack and rack retainer of FIG. 1 showing the several parts in detached position.
Figure 5:
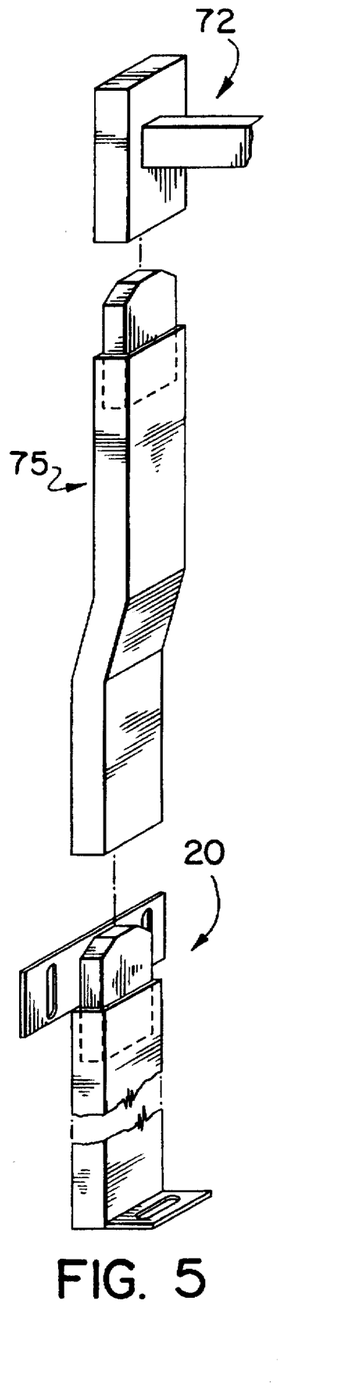
FIG. 5 is an exploded perspective view of one rack segment and associated rack retainer segment another embodiment of the carrier rack and rack retainer of FIG. 1 showing the several parts in detached position.

FIGS. 3 to 5 illustrate various possible variant embodiments of the invention using different combinations of tongues and openings to receive tongues. In FIG. 3 variant struts 70 having tongues 71 at both ends are illustrated for use with a variant bridge 72 and variant pillars 73. In FIG. 4 variant struts 75 having a tongue 76 at one end are illustrated for use with preferred bridge 24 and variant pillars 73. In FIG. 5 the combination of variant strut 75 with variant bridge 72 and preferred pillars 20 is illustrated.

Figure 6:
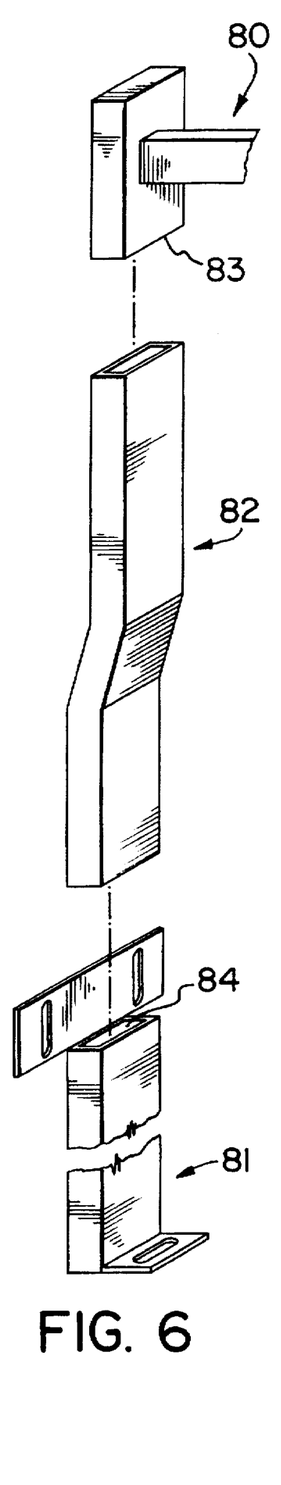
FIG. 6 is an exploded perspective view of one rack segment and associated rack retainer segment another embodiment of the carrier rack and rack retainer of FIG. 1 showing the several parts in detached position.
Figure 7:
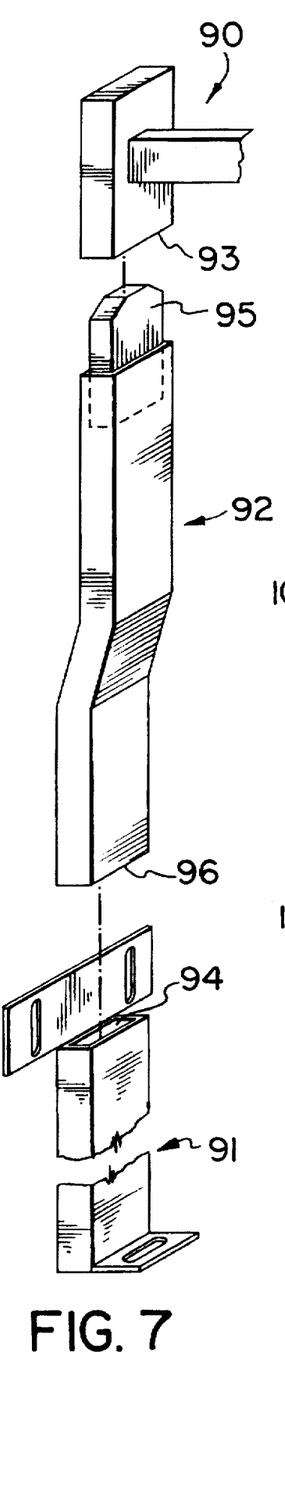
FIG. 7 is an exploded perspective view of one rack segment and associated rack retainer segment another embodiment of the carrier rack and rack retainer of FIG. 1 showing the several parts in detached position.
Figure 8:
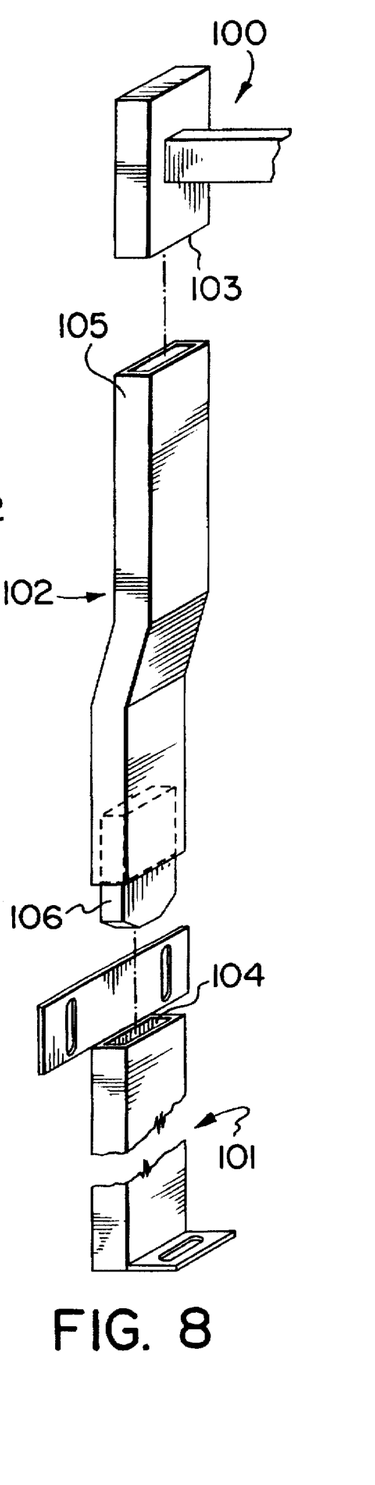
FIG. 8 is an exploded perspective view of one rack segment and associated rack retainer segment another embodiment of the carrier rack and rack retainer of FIG. 1 showing the several parts in detached position.

Tongues such as those indicated by reference numerals 40/42 may also be dispensed with partially or completely by using two sizes of tubular steel such that one size may be slid into the other, as illustrated in the variant embodiments shown in FIGS. 6 to 8. In FIG. 6 variant bridge 80 and variant pillars 81 are illustrated with variant struts 82 sized to slidingly fit into openings 83 and 84 in variant bridge 80 and variant pillars 81 respectively. In FIG. 7 variant bridge 90 and variant pillars 91 are illustrated with variant struts 92 having a tongue 95 at one end receivable by openings 93 in bridge 90 and the other end 96 sized to slidingly fit into openings 94 of variant pillars 91. FIG. 8 illustrates a similar embodiment having a variant bridge 100 and variant pillars 101 with variant struts 102 having a tongue 106 at one end receivable by openings 104 in pillars 101 and the other end 105 sized to slidingly fit into openings 103 of variant bridge 100.

The embodiment illustrated in FIG. 2 is believed to be preferable to variants having tongues 40/42 protruding from one or both ends of the struts as the pillars 20 in FIG. 2 having tongues 40/42 cannot accumulate dirt and other debris as is the case in the embodiments illustrated in FIGS. 3, 4, 6, 7, and 8. The preferred embodiment illustrated in FIG. 2 is also believed to be preferable to the variant illustrated in FIG. 5, which has a tongue protruding from one end of each strut as the open end of the strut can also accumulate dirt and other debris inside the strut. Using tubular steel for the struts facilitates cleaning the inside of the struts. Struts without tongues at at least one end is also preferable as the height of the assembled rack segment may easily be reduced by cutting back with a hacksaw the ends of the struts lacking a tongue.

Also, each variant illustrated in FIGS. 6–8 also presents the added complication of using two sizes of channel steel in fabrication and the need to provide means to limit how far pieces slid into each other.

Other modifications will be apparent to those skilled in the art and, therefore, the invention is defined in the claims.

What is claimed is:

1. For supporting a generally horizontally aligned generally rigid load in or for use with a cargo space at least in part delimited by a floor and generally vertical side walls, a combination comprising:

(a) a rack comprised of at least two assemblable rack segments, each rack segment comprised of one bridge and an associated pair of struts, each strut being a generally vertically extending bridge support column, each strut having an upper end portion extending along a longitudinal axis of the upper end portion and a lower end portion, each strut provided intermediate its end portions with a set of bends providing an offset from one end portion to the other end portion of the strut such that the end portions are generally parallel to each other but not collinear, and each bridge comprising a transverse beam and means for mating each end of the transverse beam with the upper end portion of a discrete one of the associated pair of struts in a selected one of at least two rotated positions of the strut about the longitudinal axis of the upper end portion of the strut;

(b) a rack retainer comprised of at least two pairs of pillars, each pillar being a generally vertically extending strut support column, each pillar having an upper end portion and mounting means for mounting the associated pillar generally adjacent to one of the side walls, the pillars, when so mounted, forming at least two spaced pairs of pillars having one pillar of each pair mounted adjacent to each side wall; and (c) means for mating the lower end portion of each strut of the pair of struts associated with a discrete one of the bridges with the upper end portion of a discrete pillar of a discrete one of the pairs of pillars when the upper end portion of that strut is mated with a discrete end of the transverse beam of the bridge in a selected one of the rotated positions of that strut about the longitudinal axis of the upper end portion of that strut and when that pair of pillars is mounted adjacent to a side wall, said means for mating comprised of a pair of mating portions consisting of the lower end portion of that strut having one of an open interior cross-section extending vertically and a tongue extending vertically downward therefrom and the upper end portion of the corresponding pillar having one of an open interior cross-section extending vertically and a discrete tongue protruding generally vertically therefrom selected to mate with the lower end portion of that strut in each of the rotated positions of that strut, whereby, when each end of the transverse beam of a bridge is mated with the upper end portion of a discrete one of the associated pair of struts, a rack segment is completed having a spacing between the lower end portions of the associated pair of struts determined by the selected rotated positions of the associated pair of struts, whereby each rack segment may be mated with a discrete one of the pairs of pillars thereby forming a horizontal supporting beam for a portion of the load, and whereby two or more spaced ones of the rack segments form a rack for supporting the load.

2. The combination of claim 1, wherein the lower end portion of each strut has an open interior cross-section and each pillar has a discrete tongue protruding generally vertically from the upper end portion of the associated pillar, the tongue of each pillar of a pair of pillars having a cross-section mating with the open interior cross-section of a discrete one of the struts of one of the completed rack segments in each of the rotated positions of that strut.

3. The combination of claim 2, wherein the upper end portion of each strut has an open interior cross-section and each bridge has a generally H-shaped configuration with a discrete vertical end piece at each end of the transverse beam, each end piece of a bridge being provided with a discrete downwardly protruding tongue having a cross-section mating with the open interior cross-section of the upper end portion of one discrete strut of the associated pair of struts in each of the rotated positions of that strut.

4. The combination of claim 3, wherein the open interior cross-section of the upper and lower portions of each strut are substantially identical to each other and to the open interior cross-section of each other strut.

5. The combination of claim 4, wherein the tongues and the open interior cross-sections are rectangular in cross-section.

6. The combination of claim 1, wherein the tongues and the open interior cross-sections are polygons in cross-section.

7. The combination of claim 5, wherein the pillars, struts, and bridges are steel.

8. The combination of claim 7, wherein the mounting means for mounting a pillar comprises attaching the pillar to the floor and one of the side walls.

9. The combination of claim 8, wherein the mounting means for attaching each pillar to the floor and one of the side walls additionally comprises at least one shim, whereby adjustment of the spacing of the pillars of each pair of pillars may be provided.

10. For supporting a generally horizontally aligned generally rigid load for use in or with a cargo space at least in part delimited by a floor and generally vertical side walls, a combination comprising:

(a) a rack comprised of at least two assemblable rack segments, each rack segment comprised of one bridge and an associated pair of struts,
  each strut being a generally vertically extending bridge support column having a substantially identical open interior cross-section, each strut having an upper end portion extending along a longitudinal axis of the upper end portion and a lower end portion, and
  each bridge having a generally H-shaped configuration and comprising a transverse beam with a discrete vertical end piece at each end of the transverse beam, each end piece being provided with a discrete downwardly protruding tongue having a cross-section mating with the interior cross-section of the upper end portion of any strut for mating each end of the transverse beam with the upper end portion of a discrete one of the associated struts; and (b) a rack retainer comprised of at least two pairs of pillars, each pillar being a generally vertically extending strut support column, each pillar having an upper end portion with a tongue protruding generally vertically from the upper end portion of the associated pillar, the tongue of each pillar having a cross-section mating with the interior cross-section of any of the struts, and mounting means for mounting the associated pillar generally adjacent to one of the side walls, the pillars, when so mounted, forming at least two spaced pairs of pillars having one pillar of each pair mounted adjacent to each side wall, whereby, when each end of the transverse beam of a bridge is mated with the upper end portion of a discrete one of the associated pair of struts, a rack segment is completed having a spacing between the lower end portions of the associated pair of struts, whereby each rack segment may be mated with a discrete one of the pairs of pillars thereby forming a horizontal supporting beam for a portion of the load, and whereby two or more spaced ones of the rack segments form a rack for supporting the load.

11. The combination of claim 10, wherein each strut is provided intermediate their end portions with a set of bends providing an offset from one end portion to the other end portion of the strut such that the end portions are generally parallel to each other but not collinear and wherein the interior cross-section of the upper portion of each strut mates with a discrete tongue of the associated bridge in a selected one of at least two rotated positions of the strut about the longitudinal axis of the upper end portion of the strut, whereby, when each end of the transverse beam of a bridge is mated with the upper end portion of a discrete one of the associated pair of struts, a rack segment is completed having a spacing between the lower end portions of the associated pair of struts determined by the selected rotated positions of the associated pair of struts.

12. The combination of claim 11, wherein the tongues and the open interior cross sections are rectangular in cross-section.

13. The combination of claim 11, wherein the tongues and the open interior cross sections are polygons in cross-section.

14. The combination of claim 13, wherein the pillars, struts, and bridges are steel.

15. The combination of claim 14, wherein the mounting means for mounting a pillar comprises attaching the pillar to the floor and one of the side walls.

16. The combination of claim 15, wherein the mounting means for attaching each pillar to the floor and one of the side walls additionally comprise at least one shim, whereby adjustment of the spacing of the pillars of each pair of pillars may be provided.

17. The combination of claim 10 or claim 11, wherein each bridge is substantially identical to each other bridge and each strut is substantially identical to each other strut.

18. The combination of claim 17, wherein the tongues and the open interior cross sections are rectangular in cross-section.

19. The combination of claim 10, wherein the tongues and the open interiors of the struts are polygons in cross-section.

20. The combination of claim 18, wherein the pillars, struts, and bridges are steel.

21. The combination of claim 20, wherein the mounting means for mounting a pillar comprises attaching the pillar to the floor and one of the side walls.

22. The combination of claim 21, wherein the mounting means for attaching each pillar to the floor and one of the side walls additionally comprise at least one shim, whereby adjustment of the spacing of the pillars of each pair of pillars may be provided.

* * * * *